United States Patent
Ju

(10) Patent No.: US 6,588,258 B2
(45) Date of Patent: Jul. 8, 2003

(54) METHOD FOR PROVIDING ENGINE TORQUE INFORMATION

(75) Inventor: Jin-Ho Ju, Kyungki-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 09/986,165

(22) Filed: Nov. 7, 2001

(65) Prior Publication Data

US 2002/0055815 A1 May 9, 2002

(30) Foreign Application Priority Data

Nov. 7, 2000 (KR) .......................... 2000-65840

(51) Int. Cl.[7] .............................................. G01M 15/00
(52) U.S. Cl. ..................................... 73/117.3; 73/117.3
(58) Field of Search ........................ 73/118.1, 118.2, 73/115, 117.3; 123/90.11, 339.11, 339.19, 179.16, 436, 486, 344, 179.21, 406.65, 568.21, 564, 362, 491

(56) References Cited

U.S. PATENT DOCUMENTS 5,239,963 A * 8/1993 Ikebe et al. ................ 123/419
6,425,373 B1 * 7/2002 Robichaux et al. ......... 123/436

* cited by examiner

*Primary Examiner*—Hezron Williams
*Assistant Examiner*—Monica D. Harrison
(74) *Attorney, Agent, or Firm*—Birch, Stewart, Kolasch & Birch, LLP

(57) ABSTRACT

The method for providing engine torque information according to the present invention comprises the steps of: obtaining optimal ignition timing from a chart of RPM points and an amount of air intake; obtaining revised optimal ignition timing by adding amounts of ignition timing changed by a present coolant temperature and a present air-fuel ratio to the optimal ignition timing; calculating a difference between the revised optimal ignition timing obtained and real ignition timing at a present driving state; obtaining an ignition efficiency value by using the calculated difference; obtaining indicated torque from a chart at a present driving state, and then calculating a revised present indicated torque by multiplying the indicated torque by the air-fuel ratio efficiency and the ignition efficiency value; calculating real engine torque by subtracting friction torque from the revised present indicated torque; and providing the real engine torque to other control means.

3 Claims, 5 Drawing Sheets

METHOD FOR PROVIDING ENGINE TORQUE INFORMATION

CROSS-REFERENCE TO RELATED APPLICATION

This application claims priority of Korea patent Application No. 10-2000-0065840, filed on Nov. 7, 2000.

BACKGROUND OF THE INVENTION (a) Field of the Invention

The present invention relates to a method for providing engine torque information, and more particularly, to a method for providing more accurate engine torque information to control means other than an ECU.

(b) Description of the Related Art

Generally, an ECU of an automobile, when providing torque information to other control means, provides a throttle angle of an engine or an intake manifold pressure, and therefore other control means must calculate torque with reference to the provided torque information.

For example, a conventional ECU provides the throttle angle or the intake manifold pressure to transmission control means, rather than a calculated torque.

Because the ECU is always detecting the throttle angle and the intake manifold pressure, it is easy for the ECU to acquire these data and thus provide them to other control means.

However, because the ECU provides information by which torque can be calculated rather than a calculated torque, aberrations of the information necessarily becomes great. The engine torque is quite affected by air-fuel ratio and ignition timing. Therefore, if torque is calculated based on the throttle angle or the intake manifold pressure, the influences of air-fuel ratio and ignition timing are neglected, and thus calculated torque is not correct.

Also, because fairly precise torque information should be exchanged with a motor control means in a parallel hybrid car in which an engine and a motor are directly connected, approximate torque information is not sufficient. However, the prior art can't provide sufficiently precise engine torque information.

SUMMARY OF THE INVENTION

The present invention has been made in an effort to solve the above problems. It is an object of the present invention to provide a method for providing accurate engine torque information in a present driving state to other control means.

To achieve the above object, the method for providing engine torque information according to the present invention comprises the steps of:

(a) obtaining an optimal ignition timing from a chart of RPM points and an amount of air intake;

(b) obtaining a revised optimal ignition timing by adding amounts of ignition timing changed by a present coolant temperature and a present air-fuel ratio to the optimal ignition timing obtained in step (a);

(c) calculating a difference between the revised optimal ignition timing obtained in step (b) and real ignition timing at a present driving state;

(d) obtaining an ignition efficiency value by using the difference calculated in step (c);

(e) obtaining basic indicated torque from a chart at a present driving state, and then calculating a revised present indicated torque by multiplying the basic indicated torque by the air-fuel ratio efficiency and the ignition efficiency value obtained in step (d), the revised present indicated torque being equal to maximum torque of an engine;

(f) calculating real engine torque by subtracting friction torque from the revised present indicated torque; and (g) providing the real engine torque calculated in step (f) to other control means.

DETAILED DESCRIPTION OF THE PREFERRED EMBODIMENTS

Hereinafter, a preferred embodiment of the present invention will be described in detail with reference to the accompanying drawings.

First, the present invention relates to a method for providing engine torque information to control means other than an ECU in an engine control means of a four-stroke spark-ignition engine.

Factors which affect engine torque are an amount of intake air, air-fuel ratio of intake mixture and so on, which can be calculated from an intake manifold pressure or can be directly measured.

Therefore, an electronic control unit (ECU) of an engine calculates the engine torque by considering the above factors, and then provides the engine torque information to other control means that can use engine RPM and engine load as input data.

Figure 1:
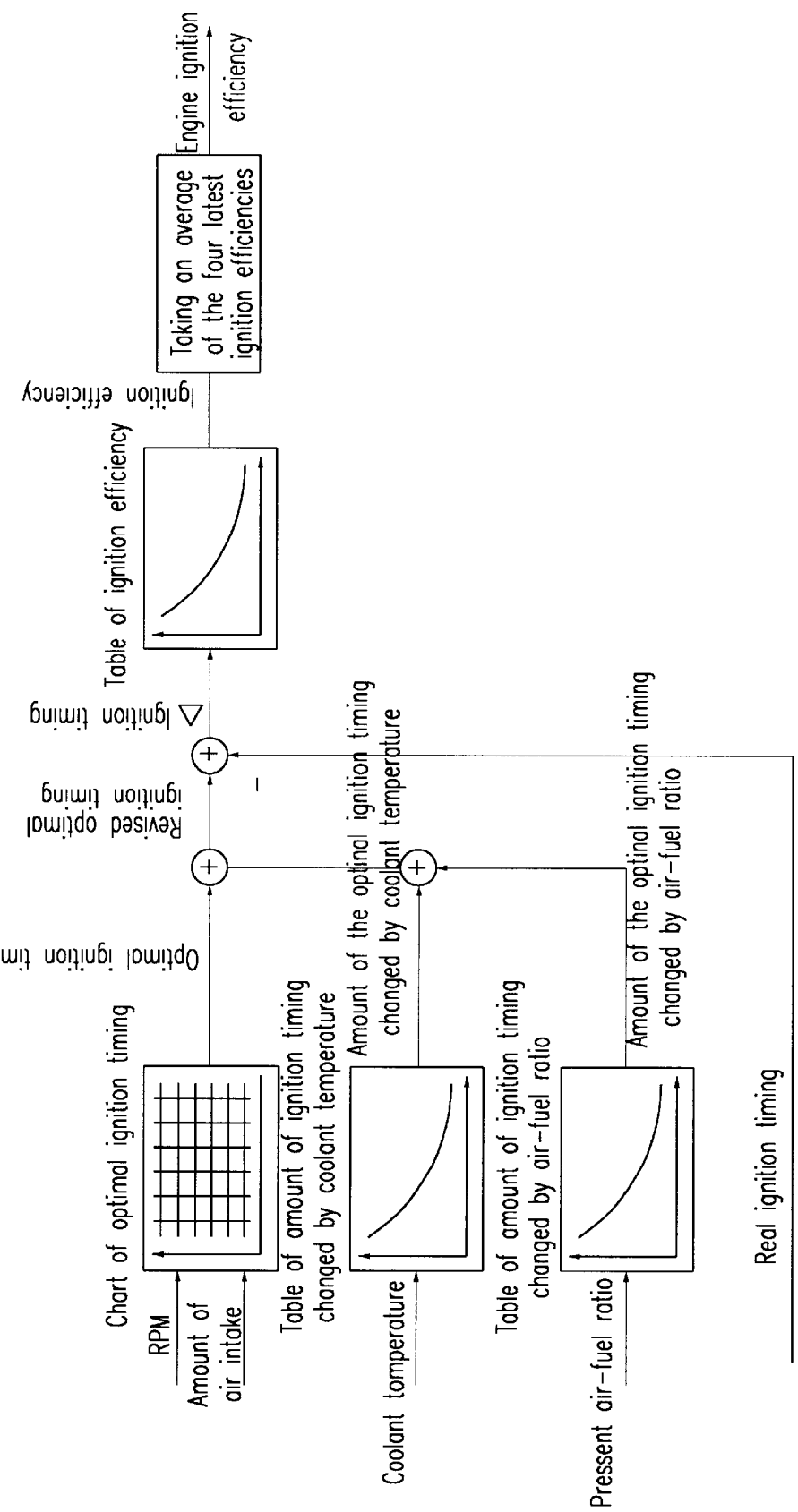
FIG. 1 shows a process calculating an ignition efficiency.

FIG. 1 shows a process of calculation of ignition efficiency, which is affected by ignition timing. Here, because the ignition firing occurs four times per cycle and ignition timing is a completely ideal value, the ignition efficiency is calculated by taking an average of the four latest ignition efficiencies.

Figure 2:
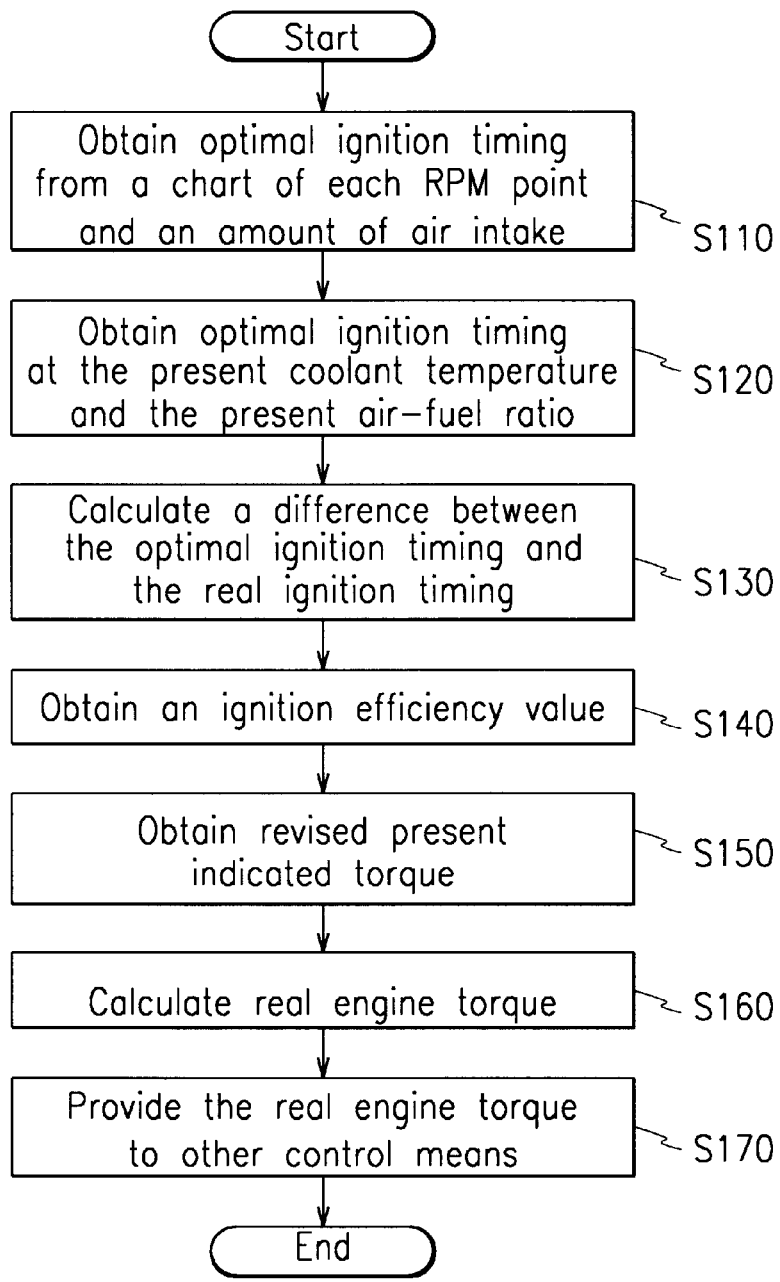
FIG. 2 is a flowchart schematically showing the order of a method for providing engine torque information according to the present invention.

FIG. 2 is a flowchart schematically showing the order of the method for providing engine torque information according to the present invention.

Referring to FIG. 2, in the method for providing the engine torque information, optimal ignition timing is obtained from a chart of each RPM point and an amount of intake air (S110), the chart being made experimentally by an engine test.

Revised optimal ignition timing can then be acquired by adding amount of ignition timing changed by a present coolant temperature and a present air-fuel ratio to the optimal ignition timing (S120). Here, the amounts of ignition timing changed by the present coolant temperature and present air-fuel ratio are obtained from a chart made through experimentation.

Thereafter, by subtracting real ignition timing at a present driving state from the revised optimal ignition timing, a difference between the revised optimal ignition timing and the real ignition timing can be obtained (S130).

Also, because ignition timing efficiency (or ignition efficiency) is a function of the difference between the revised optimal ignition timing and the real ignition timing, the ignition efficiency can be obtained with this difference.

The ignition efficiency is equal to one at the revised optimal ignition timing value, and it decreases according to decreases of torque caused by delay of the ignition timing. That is, the difference between the revised optimal ignition timing and the real ignition timing is obtained, by which an amount of decreased torque can be known.

Figure 3:
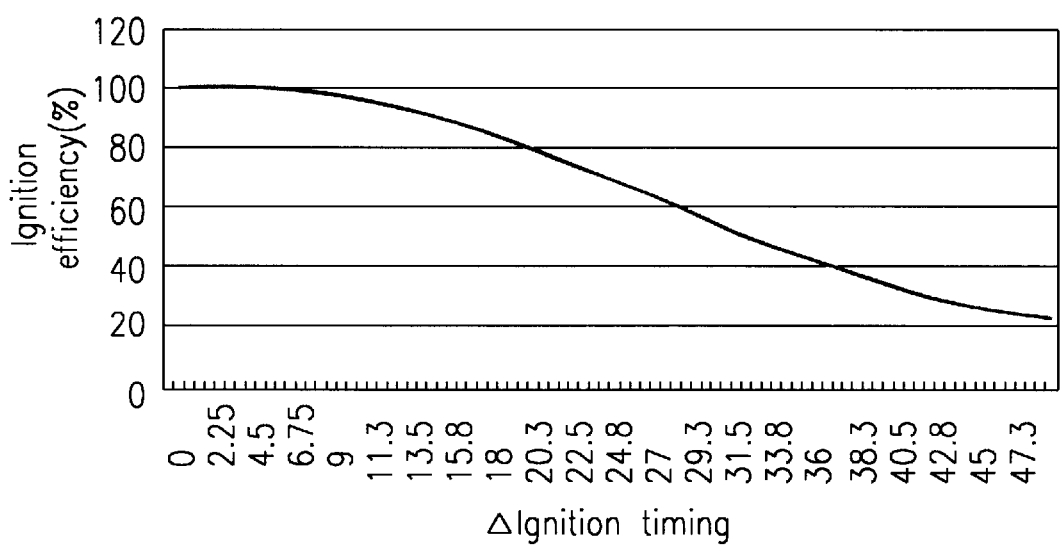
FIG. 3 is a graph showing ignition efficiency.

FIG. 3 shows the ignition efficiency over differences between the revised optimal ignition timing and the real ignition timing.

Figure 4:
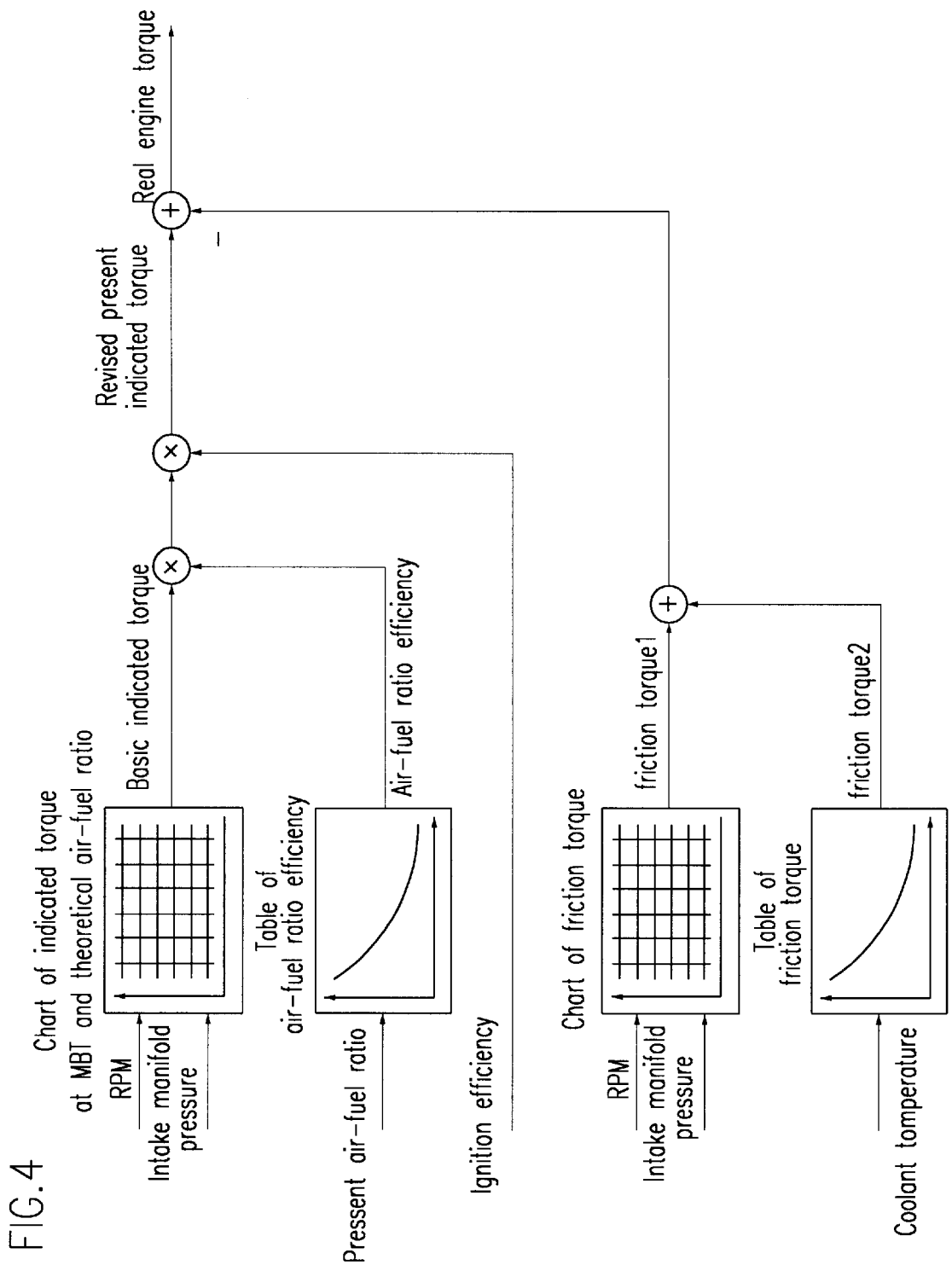
FIG. 4 shows a method for obtaining a present engine torque.

A present engine torque is known from the ignition efficiency. FIG. 4 shows a method for obtaining a present engine torque.

First, a basic indicated torque at a present driving state (a certain engine RPM and intake manifold pressure) is obtained by a chart made through experimentations.

Here, the torque is a value at a minimum spark advance for best torque (MBT), a theoretical air-fuel ratio and a normal coolant temperature.

The engine torque increases in proportion to an amount of spark advance. However, if the spark advance is greater than a certain value, the engine torque doesn't increase any more because of engine knocking and so on. The MTB is the spark advance at which the engine torque is a maximum value. The theoretical air-fuel ratio is an air-fuel ratio at which the air-fuel mass ratio is 14.7 to 1.

A present indicated torque is calculated by multiplying the basic indicated torque by an air-fuel ratio efficiency value and the ignition efficiency value (S150), the present indicated torque being revised by the air-fuel ratio and the ignition timing of the present state.

Figure 5:
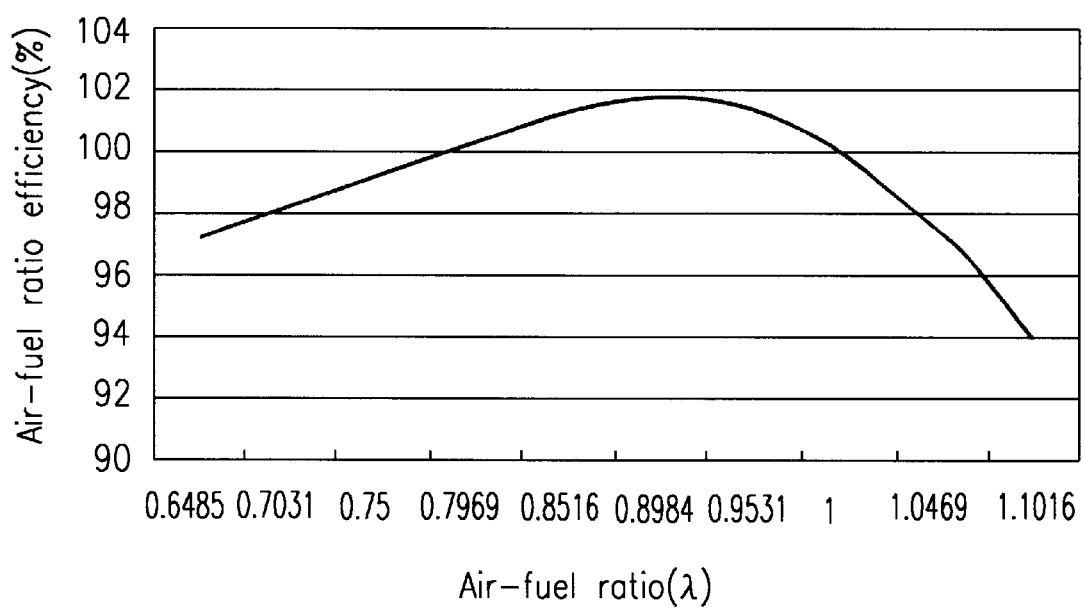
FIG. 5 is a graph showing air-fuel ratio efficiency.

Because torque is affected by an air-fuel ratio of the present driving state, the air-fuel ratio efficiency is set to one at the theoretical air-fuel ratio and it is set to reflect an air-fuel ratio's influence on the torque at a certain air-fuel ratio. FIG. 5 shows the air-fuel ratio efficiency of an engine. As shown in FIG. 5, the horizontal axis represents the air-fuel ratio and the vertical axis represents the air-fuel ratio efficiency.

The present indicated torque is a maximum torque that the engine can generate without considering torque loss caused by various kinds of engine frictions.

Real engine torque is calculated by subtracting a friction torque from the present indicated torque (S160). In step S160, the friction torque is torque loss caused by all engine frictions and is obtained by a chart and table made by experimentation. The friction torque is divided into a friction torque from a driving state and a friction torque from a coolant temperature.

The real engine torque is provided to other control means (S170). The real engine torque is an engine torque actually generated at the present driving state. By providing the real engine torque to other control means, a vehicle can be appropriately controlled.

A method for providing torque information according to the present invention can increase a controllability of a car by providing exact torque information to other control means, and furthermore it can be easily applied to a control means for a parallel hybrid car.

While the present invention has been described in detail with reference to the preferred embodiment, those skilled in the art will appreciate that various modifications and substitutions can be made thereto without departing from the sprit and scope of the present invention as set forth in the appended claims.

What is claimed is:

1. A method for providing engine torque information comprising:
   (a) obtaining optimal ignition timing from a chart of RPM points and an amount of air intake;
   (b) obtaining revised optimal ignition timing by adding amounts of ignition timing changed by a present coolant temperature and a present air-fuel ratio to the optimal ignition timing obtained in step (a);
   (c) calculating a difference between the revised optimal ignition timing obtained in step (b) and real ignition timing at a present driving state;
   (d) obtaining an ignition efficiency value by using the difference calculated in step (c);
   (e) obtaining basic indicated torque from a chart at a present driving state, and then calculating a revised present indicated torque by multiplying the basic indicated torque by the air-fuel ratio efficiency and the ignition efficiency value obtained in step (d), the revised present indicated torque being equal to maximum torque of an engine;
   (f) calculating real engine torque by subtracting friction torque from the revised present indicated torque; and
   (g) providing the real engine torque calculated in step (f) to other control means.

2. The method of claim 1 wherein the friction torque is torque to be dissipated by all frictions of the engine and is obtained by a table and a chart acquired by experimentations.

3. The method of claim 2 wherein the friction torque is composed of a value affected by a driving condition and a value affected by a coolant temperature.

* * * * *